United States Patent [19]

Kamogawa et al.

[11] Patent Number: 5,631,710

[45] Date of Patent: May 20, 1997

[54] TELEVISION SYSTEM CONTAINING A VIDEO COMPACT DISK REPRODUCER

[75] Inventors: Kouji Kamogawa; Yasuhiro Yakushiji; Hisashi Komedashi, all of Yokohama, Japan

[73] Assignee: Hitachi, Ltd., Tokyo, Japan

[21] Appl. No.: 426,572

[22] Filed: Apr. 21, 1995

[30] Foreign Application Priority Data

Apr. 25, 1994 [JP] Japan .................................. 6-086783

[51] Int. Cl.$^6$ ........................................... H04N 5/46
[52] U.S. Cl. ........................... 348/555; 348/556; 348/564
[58] Field of Search ................................ 348/554, 555, 348/556, 557, 558, 563, 564, 454, 459; H04N 5/46

[56] References Cited

U.S. PATENT DOCUMENTS

| | | | |
|---|---|---|---|
| 4,394,690 | 7/1983 | Kobayashi | 348/556 |
| 4,914,523 | 4/1990 | Maruta | 348/456 |
| 4,933,749 | 6/1990 | Van Lammeren et al. | 348/558 |
| 5,347,318 | 9/1994 | Kobayashi et al. | 348/558 |
| 5,389,974 | 2/1995 | Bae | 348/558 |
| 5,389,975 | 2/1995 | Maeshima et al. | 348/556 |
| 5,436,669 | 7/1995 | Baba | 348/558 |

FOREIGN PATENT DOCUMENTS

| | | | |
|---|---|---|---|
| 0185173 | 7/1988 | Japan | H04N 5/46 |
| 0149191 | 6/1990 | Japan | H04N 5/46 |
| 0159487 | 7/1991 | Japan | H04N 5/46 |
| 5207397 | 8/1993 | Japan | H04N 5/46 |
| 0662342 | 3/1994 | Japan | H04N 5/46 |
| 0662343 | 3/1994 | Japan | H04N 5/46 |
| 6141254 | 5/1994 | Japan | H04N 5/46 |

*Primary Examiner*—Michael Lee
*Attorney, Agent, or Firm*—Fay, Sharpe, Beall, Fagan, Minnich & McKee

[57] ABSTRACT

A television system containing a video CD reproducer intended for reducing picture distortion (aspect distortion) occurring when picture information recorded on a video CD in a standard different from the television standard is reproduced for displaying a picture on a cathode-ray tube of the television. To reduce the aspect distortion, the television system containing a video CD reproducer comprises determination means for determining the standard type of picture information recorded on a video CD played back by the video CD reproducer and deflection control means for controlling deflection of a video signal in response to the determination result of the determination means.

12 Claims, 7 Drawing Sheets

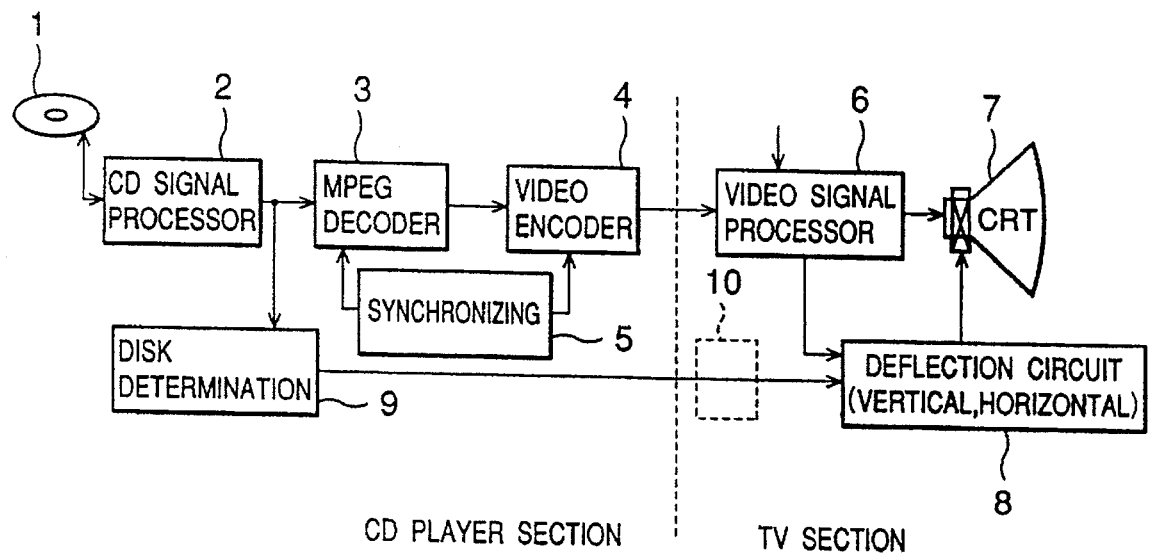

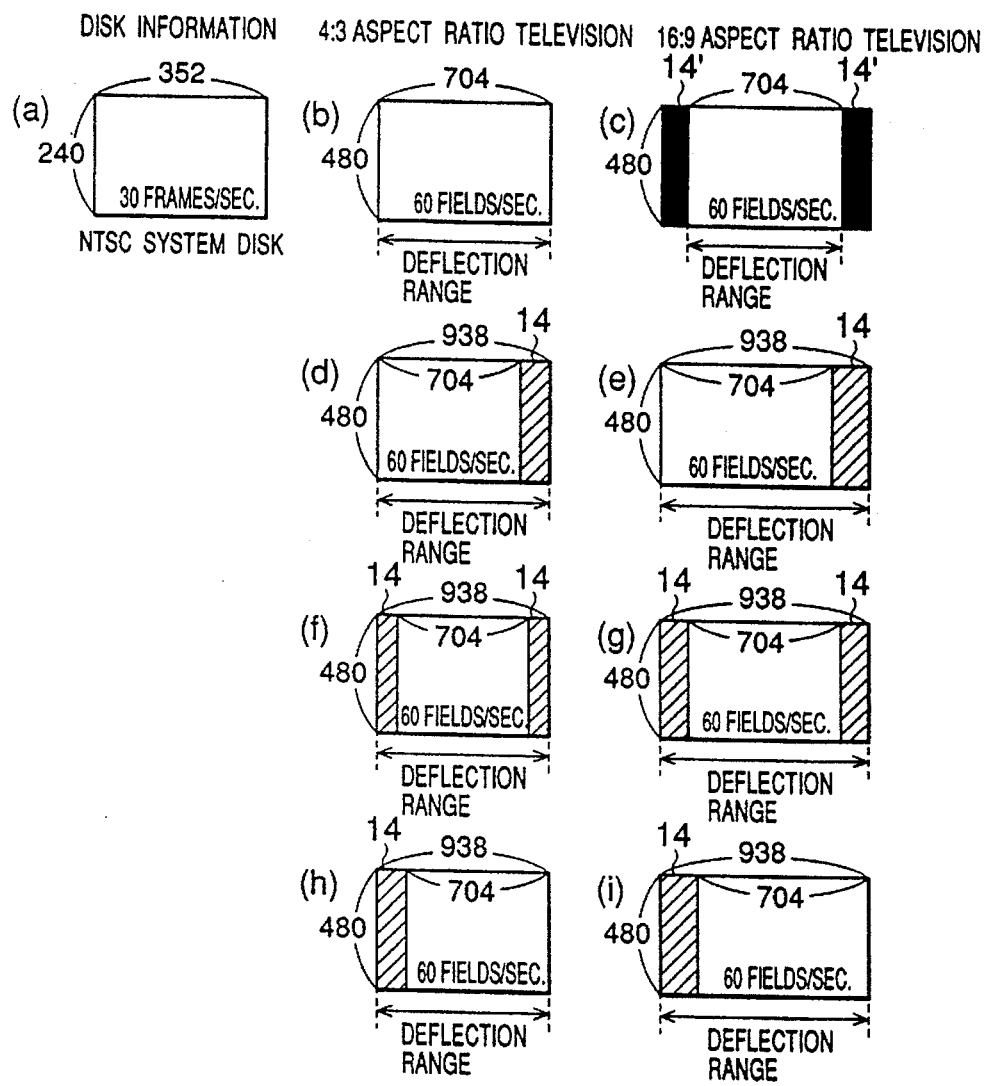
FIG.10
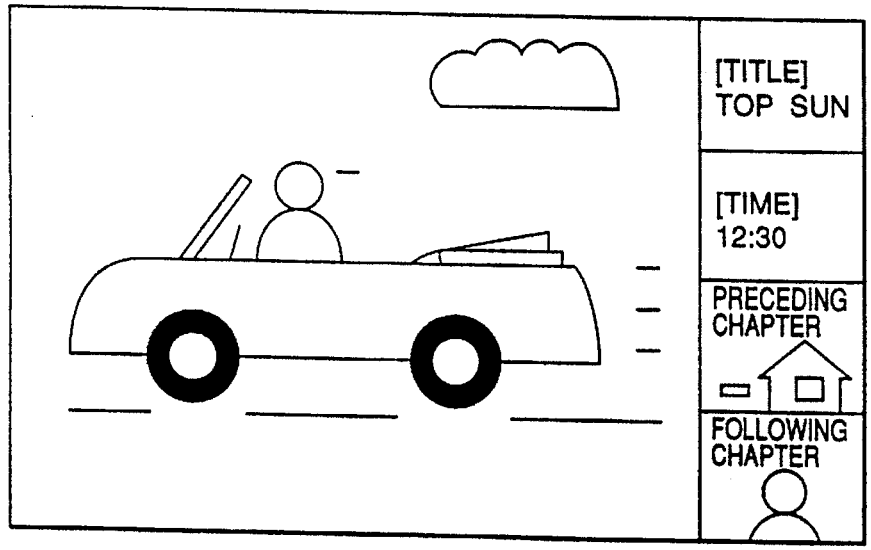

TELEVISION SYSTEM CONTAINING A VIDEO COMPACT DISK REPRODUCER

BACKGROUND OF THE INVENTION

1. Field of the Invention

This invention relates to a television system containing an apparatus for reproducing picture information recorded on a video compact disk (CD) and in particular to a television system containing a video CD reproducer adapted to reproduce picture information recorded on a video CD complying with more than one standard for displaying a picture.

2. Description of the Related Art

For example, the configuration shown in FIG. 11 is known as such a television system containing a video CD reproducer. FIG. 11 is a block diagram showing a conventional signal processing system from reproducing picture information recorded on a video CD to display a picture. In the figure, numeral 1 is a video CD, numeral 2 is a CD signal processor, numeral 3 is an MPEG (Moving Picture Experts Group) decoder, numeral 4 is a video encoder, numeral 5 is a synchronizing circuit, numeral 6 is a video signal processor, numeral 7 is a cathode-ray tube (CRT), and numeral 8 is a deflection circuit. In the figure, a video CD reproducer, which will be hereinafter referred to as a CD player, is shown to the left of the broken line and a television set is shown to the right of the broken line, wherein a picture reproduced from picture information on the video CD 1 is displayed on the television.

Only the necessary part of picture information reproduced from the video CD 1 is processed by the CD signal processor 2, and the result then is supplied to the MPEG decoder 3, which performs decoding processing such as data expansion based on a synchronizing signal from the synchronizing circuit 5 for providing a digital video signal. This digital video signal is supplied to the video encoder 4, which converts it into an analog signal and further adds a synchronizing signal from the synchronizing circuit 5 to the analog signal for converting the analog signal into a standard composite color video signal. Like a reception composite color video signal supplied from a reception system (not shown), the composite color video signal is processed by the video signal processor 6 and supplied to the CRT 7. The video signal processor 6 separates the synchronizing signal from the composite color video signal and the deflection circuit 8 (consisting of horizontal and vertical deflection channels) deflects the CRT 7 in synchronization with the synchronizing signal, whereby a picture reproduced from picture information on the video CD 1 is displayed on the screen of the CRT 7.

Picture information digitized and compressed complying with the MPEG standard is recorded on the video CD 1 played back by such a television system containing a video CD reproducer. CDs on which the picture information is recorded are roughly classified into those containing information recorded in the format compatible with the NTSC (National Television System Committee) system, which will be hereinafter referred to as NTSC system video CDs, and those containing information recorded in the format compatible with the PAL (Phase Alternation by Line) system, which will be hereinafter referred to as PAL system video CDs. On the NTSC system video CD, picture information is recorded in the data format of the number of frames per second 30, the number of horizontal scanning lines per frame 240, and the number of dots per line 352. On the PAL system video CD, picture information is recorded in the data format of the number of frames per second 25, the number of horizontal scanning lines per frame 288, and the number of dots per line 352.

The picture information is converted into a digital video signal by the MPEG decoder 3 so that a picture can be displayed on the television. The MPEG decoder 3 is adapted to convert the picture information to be reproduced into a video signal matching the television system for supply to the television regardless of whether the video CD is an NTSC or PAL video CD.

For example, to display picture information recorded on a PAL system video CD on an NTSC system television set, the MPEG decoder 3 converts the picture information on the PAL system video CD into digital video signal with the number of fields per second 60, the effective number of lines per frame 480, and the number of dots per line 704. Of course, for an NTSC system video CD, the MPEG decoder 3 provides such a digital video signal. To perform such conversion, the same picture information is read twice from a memory contained in the MPEG decoder 3 for substantially doubling the number of frames and the number of lines. However, to display picture information recorded on a PAL system video CD on an NTSC system television set, if the number of lines of the picture information recorded on the PAL system video CD is simply doubled (288×2=576), the result does not match the effective number of lines of the NTSC system television set (480). Then, for example, picture information of "576−480=96 lines" is deleted in the vertical direction from the original picture information for display on the television.

To display picture information recorded on an NTSC system video CD on a PAL system television set, the MPEG decoder 3 converts the picture information on the NTSC system video CD into digital video signal with the number of fields per second 50, the effective number of lines per frame 576, and the number of dots per line 704. Of course, for a PAL system video CD, the MPEG decoder 3 provides such a digital video signal. Also in this case, if the number of lines of the picture information recorded on the NTSC system video CD is simply doubled (240×2=480), the result does not match the effective number of lines of the PAL system television set (576). Then, for example, a signal of "576−480=96 lines" is added to the original picture information in the vertical direction for display on the television.

However, to play back video CDs of different types on which video signals are recorded in accordance with different television standards by a CD player contained in a television as described above, the following problems arise:

(1) If the picture information recording system on a video CD differs from the television system, the aspect ratio of a picture displayed on CRT differs from that of the CRT screen, thus the displayed picture is distorted and becomes difficult to see. Such distortion will be hereinafter referred to as aspect distortion and is discussed below:

To display picture information recorded on a PAL system video CD on an NTSC system television set, a picture from which 96-line picture information is deleted in the vertical direction is displayed on the television, as described above. Thus, the actual picture displayed on the television is extended to 576/480 times as large as the original picture in the vertical direction, for example, as shown in FIG. 12 (a). Therefore, aspect distortion occurs as a phenomenon such that a round picture is displayed as a lengthwise extended picture.

To display picture information recorded on an NTSC system video CD on a PAL system television set, a picture to which 96-line picture information is added in the vertical direction is displayed on the television, as described above. Thus, the actual picture displayed on the television is shrunk to 480/576 times as large as the original picture in the vertical direction, for example, as shown in FIG. 12 (b). Therefore, aspect distortion occurs as a phenomenon such that a round picture is displayed as a widthwise extended picture.

(2) To display a picture on an NTSC system television set using picture information reproduced from a PAL system video CD, 96-line picture information is lost, as described above. Also, to display a picture on a PAL system television set using picture information reproduced from an NTSC system video CD, screen flicker is prominent, because human eyes are sensitive to flicker on a picture having a field frequency of 50 Hz.

(3) Normally, additional information such as information on a moving picture such as the title, creator name, and preceding and following chapters of the moving picture and time-of-day information is recorded on a video CD in addition to picture information of the moving picture. The additional information can be read and displayed on a screen as required. However, to display such additional information on the screen, hitherto, a PinP (picture in picture) system has been adopted for displaying an image of the additional information in a part of the moving picture display area. However, in the PinP system, a part of the moving picture display area is lost and the PinP area becomes a visually offensive feature.

SUMMARY OF THE INVENTION

It is therefore a first object of the invention to solve the problem (1) and provide a television system containing a video CD reproducer which can display an easy-to-see picture with reduced aspect distortion even if a video CD on which picture information is recorded is of a system different from the television section system used for play back.

It is therefore a second object of the invention to solve the problem (2) and provide a television system containing a video CD reproducer which can efficiently use picture information from a video CD for picture display and inhibit screen flicker.

It is therefore a third object of the invention to solve the problem (3) and provide a television system containing a video CD reproducer which can simultaneously display a moving picture and an image of additional information on a single screen without affecting the displayed moving picture.

To accomplish the first object of the invention, according to the invention, there is provided, in a television system comprising a television section for processing a video signal for displaying a picture on a display screen of a cathode-ray tube (CRT), a video CD reproducer for reproducing picture information recorded on video CDs complying with different standards and converting the reproduced picture information into a video signal based on a standard of the television section, and means for providing a deflection to the video signal, wherein the deflected video signal is supplied to the display screen of the CRT for displaying a picture, the television system further comprises:

(a) determination means for determining a standard type of picture information recorded on the video CD played back by the video CD reproducer; and (b) deflection control means for controlling deflection of the video signal in accordance with the determination result of the determination means.

The determination means may read information concerning the standard type of picture information recorded on the video CD and output a control signal in accordance with the read information. It may also output a control signal at least when the standard of the picture information recorded on the video CD differs from the television section standard.

The deflection control means may have means for controlling a deflection current supplied to a deflection system of the CRT in accordance with the control signal output from the determination means. For example, when the television section standard is an NTSC system and the determination means determines that the standard of the picture information recorded on the video CD is PAL system, the deflection control means controls the deflection of the video signal so as to reduce the picture on the display screen of the CRT in a vertical direction or enlarge it in a horizontal direction. On the contrary, when the television section standard is a PAL system and the determination means determines that the standard of the picture information recorded on the video CD is NTSC system, the deflection control means controls the deflection of the video signal so as to enlarge the picture on the display screen of the CRT in a vertical direction.

To accomplish the second object of the invention, according to the invention, there is provided, in a television system comprising a television section for processing a video signal for displaying a picture on a display screen of a cathode-ray tube (CRT), a video CD reproducer for reproducing picture information recorded on video CDs complying with different standards and converting the reproduced picture information into a video signal based on a standard of the television section, and means for providing a deflection to the video signal, wherein the deflected video signal is supplied to the display screen of the CRT for displaying a picture, the television system further comprises:

(a) conversion means for converting the picture information reproduced from the video CD into a video signal having a number of fields and a number of lines different from those of the television section standard and supplying the video signal to the television section; and (b) the deflection means, for deflecting the video signal from the conversion means and supplying it to the display screen of the CRT, which is adapted to be able to operate in synchronization with the video signal from the conversion means.

For example, when the television section standard is an NTSC system, the conversion means may convert the picture information reproduced from the video CD into a video signal having the number of fields and the number of lines compliant with the PAL system. For example, when the television section standard is a PAL system, the conversion means converts the picture information reproduced from the video CD into a video signal having the number of fields and the number of lines compliant with the NTSC system.

To accomplish the third object of the invention, according to the invention, there is provided, in a television system comprising; a television section for processing a video signal for displaying a picture on a display screen of a cathode-ray tube (CRT); a video CD reproducer for reproducing picture information recorded on a video CD and converting the reproduced picture information into a video signal; and means for providing a deflection to the video signal throughout the display screen of the CRT, wherein the deflected video signal is supplied thereto for displaying a picture; the television system further comprises compression means for executing time axis compression of the picture information reproduced from the video CD for each line and generating a video signal having a blank information part on each line, extraction means for extracting additional information other than the picture information, recorded on the video CD; in the television system, when the video signal having a blank information part generated by the compression means is deflected and supplied to the display screen of the CRT for displaying the picture, the additional information extracted by the extraction means is displayed in a blank display area on the display screen formed by the blank information part.

According to the form for accomplishing the first object of the invention, the determination means determines the standard type of picture information recorded on a video CD and the deflection control means controls a deflection of the video signal in response to the determination result. Thus, even if picture information recorded on a video CD in a standard different from the television section standard is reproduced, the picture on the display screen can be enlarged or reduced in the vertical or horizontal direction and aspect distortion of the picture can be reduced for providing an easy-to-see picture for the user. For example, to reproduce picture information recorded on a video CD complying with the PAL standard by a CD reproducer contained in an NTSC system television section, the determination means outputs a control signal in accordance with the standard difference between them and the deflection control means controls the deflection of the video signal so as to reduce the picture on the display screen of the CRT in the vertical direction or enlarge it in the horizontal direction in response to the control signal. Therefore, to reproduce picture information recorded on a video CD in the PAL standard and display the picture on an NTSC system television set, a picture extended in the vertical direction was displayed formerly, but the picture is reduced in the vertical direction in the invention, enabling display of an easy-to-see picture with reduced aspect distortion. If picture information recorded on a video CD complying with the NTSC standard is reproduced by a CD reproducer contained in a PAL system television section, the deflection control means controls deflection of the video signal so as to enlarge the picture on the display screen of the CRT in the vertical direction or reduce it in the horizontal direction. Thus, the picture formerly reduced in the vertical direction for display can be extended in the vertical direction and displayed as a picture with reduced aspect distortion.

According to the form for accomplishing the second object of the invention, to display a picture in an NTSC system television section from picture information recorded on a PAL system video CD, the conversion means generates an NTSC system video signal having only the number of fields and the number of lines complying with the PAL system from the picture information, and the deflection means is adapted to be able to operate in synchronization with the video signal from the conversion means. Thus, all lines are displayed in each field on the display screen and all the picture information contents of the PAL system television CD are displayed. To display a picture in a PAL system video section from picture information recorded on an NTSC system video CD, a PAL system video signal having only the number of fields and the number of lines complying with the NTSC system is formed from the picture information and supplied to the television section having the synchronous deflection system operating in synchronization with the PAL system video signal. Thus, the number of fields of the picture displayed on the display screen becomes different from that of the PAL system, making screen flicker hard to see.

Further, according to the form for accomplishing the third object of the invention, the compression means executes time axis compression of picture information reproduced from a video CD for each line and generates a video signal having a blank information part on each line. If the video signal is deflected throughout the display screen of the CRT, a display area (blank display area), separate from an area in which a picture provided by the picture information recorded on the video CD is displayed, can be provided on the display screen. If additional information extracted by the extraction means is displayed in the blank display area, the picture provided by the picture information does not overlap the image provided by the additional information. Therefore, the third form of the invention enables the user to obtain additional information without losing the picture from the picture information.

BRIEF DESCRIPTION OF THE DRAWINGS

In the accompanying drawings:

FIG. 1 is a block diagram showing a first embodiment of a television system containing a video CD reproducer according to the invention;

FIG. 2 is a display rate index table for video CDs compliant with the MPEG standard;

FIG. 10 is an illustration showing display picture examples according to the third embodiment shown in FIG. 9;

DESCRIPTION OF THE PREFERRED EMBODIMENTS

Referring now to the accompanying drawings, there are shown preferred embodiments of the invention.

Figure 11:
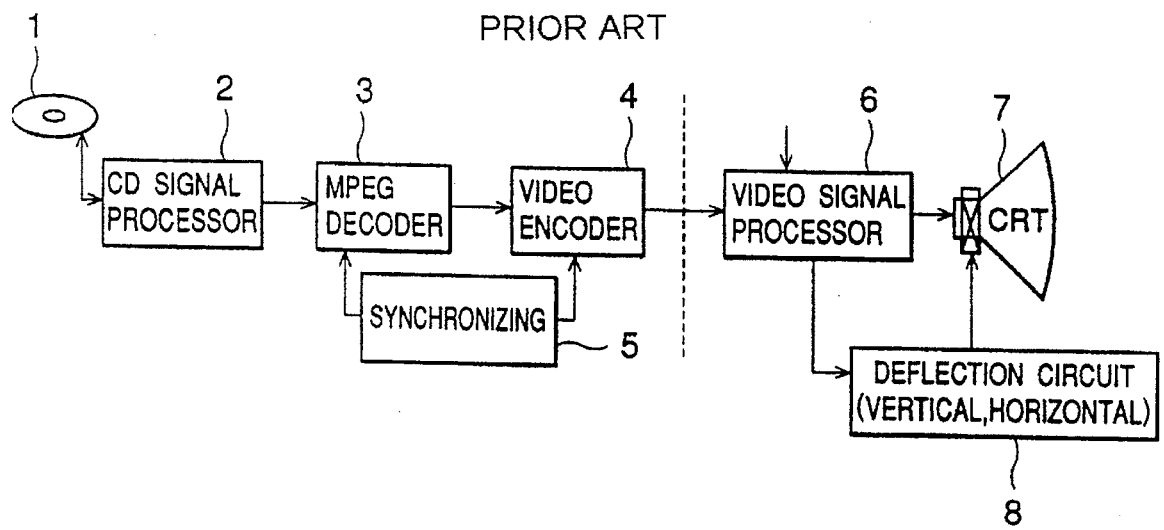
FIG. 11 is a block diagram showing an example of a television system using a video CD reproducer in the related art.
Figure 12:
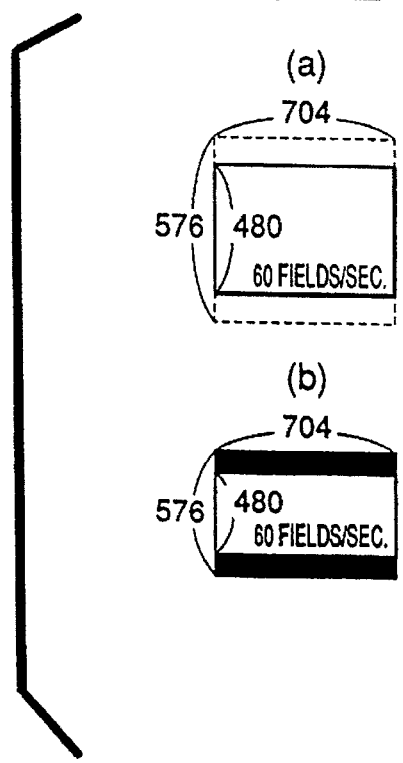
FIG. 12 is an illustration showing display picture examples in the example in the related art shown in FIG. 11.

A first embodiment of the invention will be discussed. FIG. 1 is a block diagram showing the first embodiment of a television system containing a video CD reproducer according to the invention, wherein numeral 9 is a disk determination circuit and numeral 10 is a television microcomputer. Components identical with or similar to those previously described with reference to FIG. 11 are denoted by the same reference numerals in FIG. 1 and will not be discussed again. In FIG. 1, a CD player is contained in a television set and the contained CD player part will be hereinafter referred to as a CD player section and the television as a television section.

As previously described with reference to FIG. 11, also in the first embodiment, picture information reproduced from a video CD 1 is converted into a digital video signal in the signal format based on the television section system by an MPEG decoder 3, and the signal is processed by a video encoder 4 and a video signal processor 6 for being supplied to a cathode-ray tube (CRT) 7.

On the other hand, the picture information output from a CD signal processor 2 is also fed into the disk determination circuit 9, which then determines whether the video CD to be played back is an NTSC or PAL system video CD. Each video CD compliant with the MPEG standard has a record area beginning with a display rate index specifying the number of frames per second as shown in FIG. 2. To play back the video CD, first the display rate index is read. For example, when the display rate index data is "0011," the video CD is determined to be a PAL system video CD; when the data is "0101," the video CD is determined to be an NTSC system video CD. The accurate number of frames per second in the NTSC system is 29.97, but is assumed to be 30 as described above for convenience of the description.

If the disk determination circuit 9 is built into the NTSC system television section, when the read display rate index data is "0100," the disk determination circuit 9 may determine the video CD to be a video CD complying with the same standard as the television section and output no control signal; when the read display rate index data is other than "0100," for example, "0011," the disk determination circuit 9 may determine the video CD to be a video CD complying with a standard different from the television section standard (PAL system video CD) and output a control signal. Likewise, if the disk determination circuit 9 is built in the PAL system television section, when the read display rate index data is "0011," the disk determination circuit 9 may output no control signal; when the data is other than "0011," the disk determination circuit 9 may output a control signal.

The television section controls a deflection circuit 8 directly or via the television microcomputer 10 normally provided for controlling the television in response to the determination result (control signal) of the disk determination circuit 9. The deflection circuit 8 is controlled for switching horizontal or vertical deflection or both waveforms so that no aspect distortion occurs on a picture displayed on the CRT 7 regardless of whether the video CD 1 is a PAL or NTSC system video CD.

Figure 3:
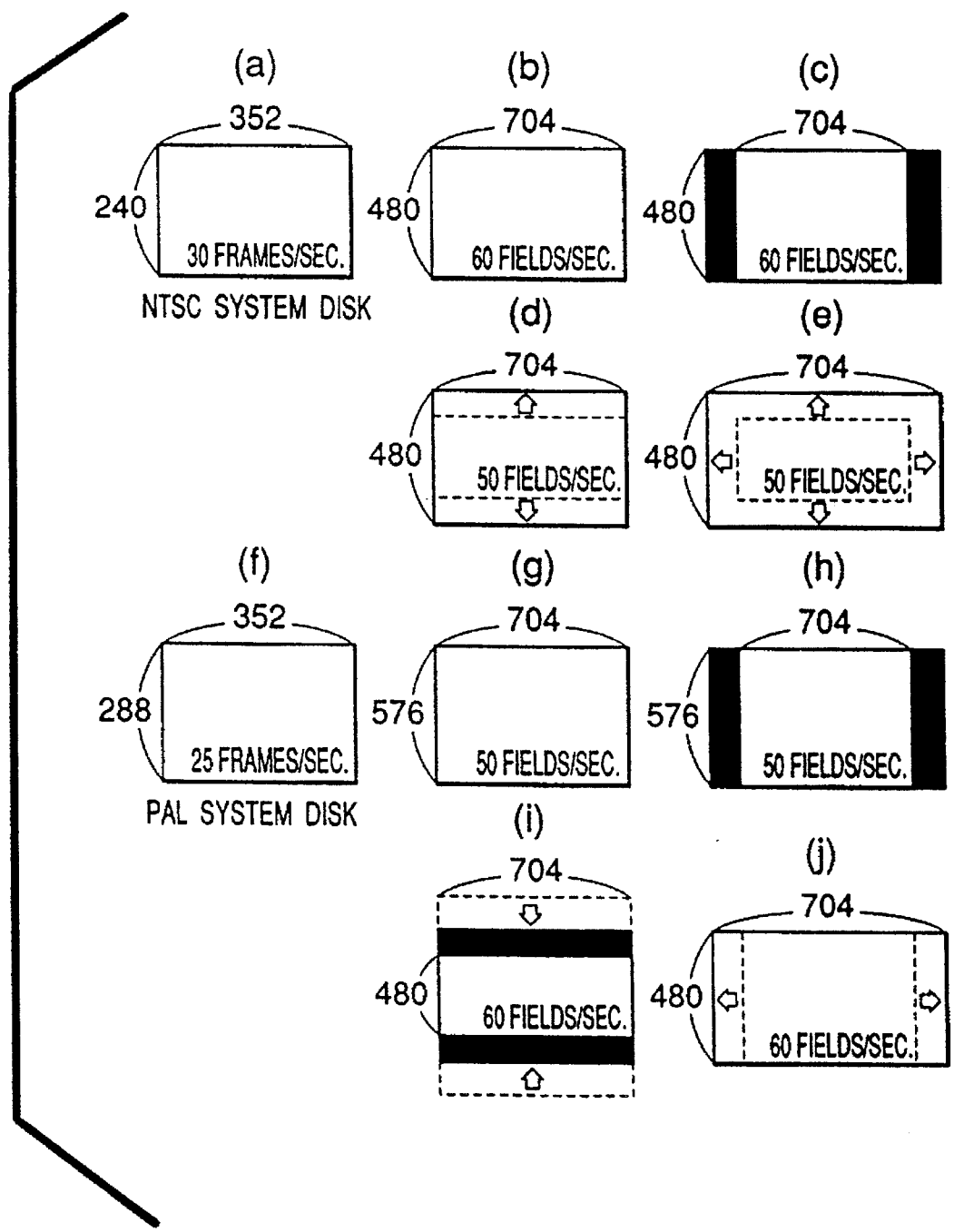
FIG. 3 is an illustration showing picture display examples on display screens according to the first embodiment shown in FIG. 1.

FIG. 3 is an illustration showing display pictures for each video CD type according to the first embodiment of the invention shown in FIG. 1.

When the video CD 1 is an NTSC system video CD, picture information with the number of frames per second 30, the number of lines per frame 240, and the number of dots per line 352 is recorded as shown in FIG. 3 (a). If a picture for the picture information is displayed on the screen of the CRT 7 having a 4:3 aspect ratio in the NTSC system television section, of course, the picture is displayed without aspect distortion on the entire screen as shown in FIG. 3 (b). If a picture for the picture information is displayed on the screen of the CRT 7 having a 16:9 aspect ratio in the NTSC system television section, the MPEG decoder 3 forms a digital video signal for the NTSC system having a 4:3 aspect ratio and black portions in which no picture is displayed occur on the left and right of the screen as shown in FIG. 3 (c), but the picture is displayed without aspect distortion.

On the other hand, when the video CD 1 is an NTSC system video CD, if a picture for the picture information on the video CD 1 is displayed on the screen of the CRT 7 having a 4:3 aspect ratio in the PAL system television section, in the conventional system, aspect distortion arises such that the picture is shrunk in the vertical direction occurs and black portions occur in which no picture is displayed on the top and bottom of the screen. However, in the embodiment, the disk determination section 9 determines that the video CD 1 is an NTSC system video disk for the television section and the deflection circuit 8 is controlled in response to the determination result for enlarging the picture on the screen by a factor of 576/480 in the vertical direction, so that the picture is displayed on the full screen as shown in FIG. 3 (d) and aspect distortion is also removed.

When the video CD 1 is an NTSC system video CD and a picture for the picture information on the video CD 1 is displayed on the screen of the CRT 7 having a 16:9 aspect ratio in the PAL system television section, the MPEG decoder 3 forms a digital video signal for the PAL system having a 4:3 aspect ratio. Thus, in the conventional display method in which the deflection circuit 8 is not controlled, the picture is displayed in the portion surrounded by the broken line in the screen as shown in FIG. 3 (e). However, in the embodiment, the disk determination section 9 determines that the video CD 1 is an NTSC system video disk for the television section and the deflection circuit 8 is controlled in response to the determination result for enlarging the picture on the screen fully in the horizontal and vertical directions, so that aspect distortion is reduced compared with the conventional method in which the picture is displayed in the portion surrounded by the broken line. Of course, if the vertical enlargement scale is made greater than the horizontal enlargement scale and the picture is displayed fully in the vertical direction, aspect distortion can be removed although some black portions occur on both horizontal sides.

When the video CD 1 is a PAL system video CD, picture information with the number of frames per second 25, the number of lines per frame 288, and the number of dots per line 352 is recorded as shown in FIG. 3 (f). If a picture for the picture information is displayed on the screen of the CRT 7 having a 4:3 aspect ratio in the PAL system television section, of course, the picture is displayed without aspect distortion on the entire screen as shown in FIG. 3 (g). If a picture for the picture information is displayed on the screen of the CRT 7 having a 16:9 aspect ratio in the PAL system television section, the MPEG decoder 3 forms a digital video signal for the PAL system having a 16:9 aspect ratio, and black portions in which no picture is displayed occur on the left and right of the screen as shown in FIG. 3 (h), but the picture is displayed without aspect distortion.

On the other hand, when the video CD 1 is a PAL system video CD, if a picture for the picture information on the video CD 1 is displayed on the screen of the CRT 7 having a 4:3 aspect ratio in the NTSC system television section, in the conventional system, aspect distortion occurs such that the picture displayed on the entire screen is extended in the vertical direction. However, in the embodiment, the disk determination section 9 determines that the video CD 1 is a PAL system video disk for the television section and the deflection circuit 8 is controlled in response to the determination result for reducing the picture on the screen by a factor of 480/576 in the vertical direction, so that black portions are displayed on the top and bottom of the screen as shown in FIG. 3 (i), but the displayed picture does not involve aspect distortion. In contrast, the deflection circuit 8 may be controlled so as to execute horizontal enlargement equivalent to that by a factor of 576/480.

When the video CD 1 is a PAL system video CD and a picture for the picture information on the video CD 1 is displayed on the screen of the CRT 7 having a 16:9 aspect ratio in the NTSC system television section, the MPEG decoder 3 forms a digital video signal for the NTSC system having a 4:3 aspect ratio. Thus, in the conventional display method in which the deflection circuit 8 is not controlled, the picture having aspect distortion is displayed in the portion surrounded by the broken line in the screen as shown in FIG. 3 (j). However, in the embodiment, the disk determination section 9 determines that the video CD 1 is a PAL system video disk for the television section and the deflection circuit 8 is controlled in response to the determination result for enlarging the picture on the screen fully in the horizontal direction, so that the picture with reduced aspect distortion is displayed on the full screen having a 16:9 aspect ratio as shown in FIG. 3 (j). Of course, aspect distortion can also be further reduced or removed by executing vertical enlargement in addition to horizontal enlargement.

Thus, according to the embodiment, the disk determination circuit 9 determines the standard type of picture information recorded on a video CD and the deflection circuit 8 controls video signal deflection. Therefore, even if the picture information recorded on a video CD in accordance with a standard different from the television section standard is reproduced, the picture on the screen can be enlarged or reduced in the horizontal or vertical direction for reducing aspect distortion of the picture. Thus, in the embodiment, even if the picture information recorded on a video CD in accordance with a standard different from the television section standard is reproduced, an easy-to-see picture with little aspect distortion can be provided for the user.

Figure 4:
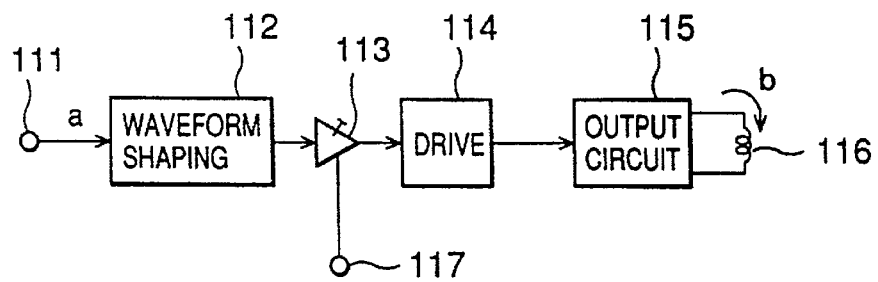
FIG. 4 is a block diagram showing a specific example of the deflection circuit in FIG. 1.

FIG. 4 is a block diagram showing a specific example of the deflection circuit 8 in FIG. 1, wherein numeral 111 is an input terminal, numeral 112 is a waveform shaping circuit, numeral 113 is a variable gain circuit, numeral 114 is a drive circuit, numeral 115 is an output circuit, numeral 116 is a deflection coil, and numeral 117 is an input terminal.

The specific example can be applied to both horizontal and vertical deflection circuits.

In FIG. 4, a horizontal or vertical synchronizing signal a output from the video signal processor 6 in FIG. 1 is input through the input terminal 111 to the waveform shaping circuit 112, which then shapes the signal into a predetermined waveform. The resultant signal is fed into the variable gain circuit 113. A control signal is supplied from the disk determination circuit 9 or the television microcomputer 10 in FIG. 1 to the input terminal 117 of the variable gain circuit 113 for controlling a gain of the variable gain circuit 113. The drive circuit 114 drives the output circuit 115 in response to an output signal of the variable gain circuit 113 for supplying a saw tooth-like deflection current b to the horizontal or vertical deflection coil 116.

Figure 5:
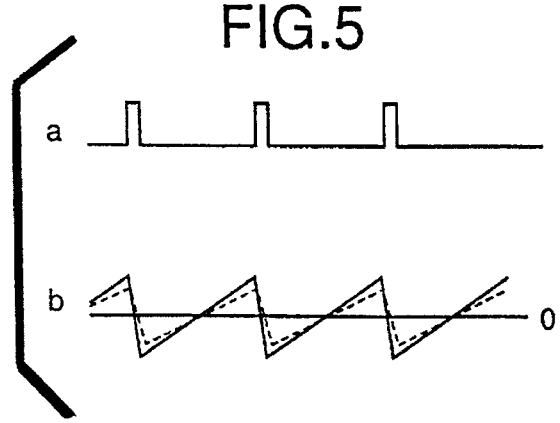
FIG. 5 is an illustration showing waveforms of input/output signals of the specific example shown in FIG. 4.

If the gain of the variable gain circuit 113 is increased, the amplitude of the deflection current b becomes large as shown by the solid line in FIG. 5, whereby the picture on the screen is enlarged in the horizontal or vertical direction. If the gain of the variable gain circuit 113 is decreased, the amplitude of the deflection current b becomes small as shown by the broken line in FIG. 5, whereby the picture on the screen is shrunk in the horizontal or vertical direction.

If the deflection circuit 8 is a vertical deflection circuit provided in the NTSC system television section, when the control signal from the disk determination circuit 9 output under the above-mentioned conditions (for example, the video CD 1 is a PAL system video CD) is input to the input terminal 117, the gain of the variable gain circuit 113 may be reduced.

If the deflection circuit 8 is a vertical deflection circuit provided in the PAL system television section, when the control signal from the disk determination circuit 9 output under the above-mentioned conditions (for example, the video CD 1 is an NTSC system video CD) is input to the input terminal 117, the gain of the variable gain circuit 113 may be increased.

Thus, according to the deflection circuit 8 shown in FIG. 4, deflection for compensating aspect distortion can be executed by a simple configuration.

Figure 6:
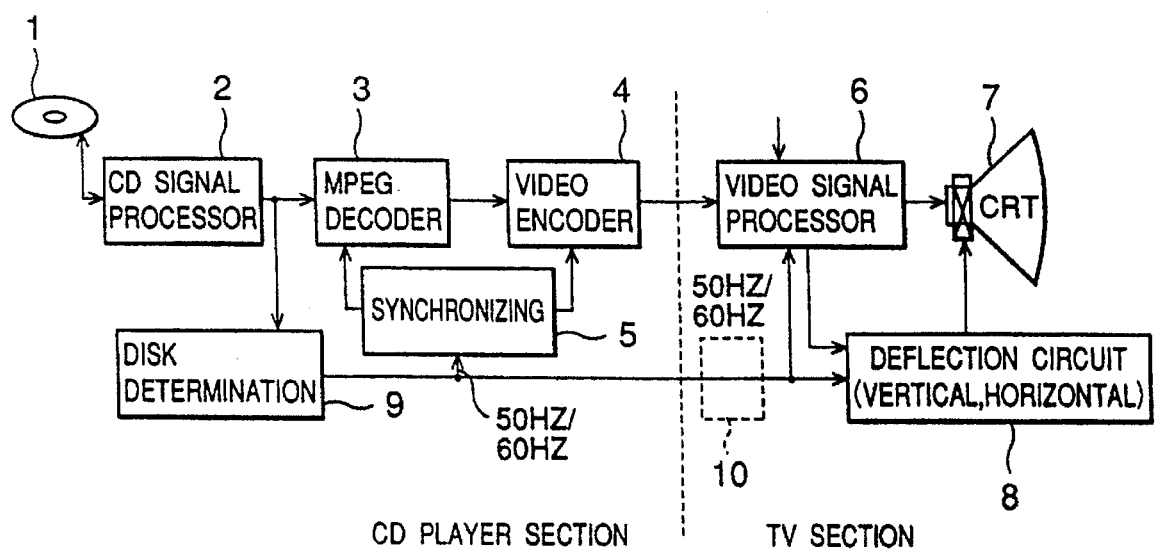
FIG. 6 is a block diagram showing a second embodiment of a television system containing a video CD reproducer according to the invention.

Next, a second embodiment of the invention will be discussed. FIG. 6 is a block diagram showing the second embodiment of a television system containing a video CD reproducer according to the invention. Components identical with or similar to those previously described with reference to FIG. 1 are denoted by the same reference numerals in FIG. 6 and will not be discussed again.

In FIG. 6, when the user specifies 50 or 60 Hz, the field frequency of a synchronizing circuit 5 is set to 50 or 60 Hz as specified whenever a disk determination circuit 9 determines the type of video CD 1. Then, a video encoder 4 outputs a composite color video signal compliant with the PAL system, with the field frequency 50 Hz and the number of lines 576, or the NTSC system, with the field frequency 60 Hz and the number of lines 480, and matching a television section in other parts such as chroma signal carrier frequency and modulation system. At this time, a deflection circuit 8 is assigned to the synchronizing operation to the video signal output from the video encoder 4. Such a switching operation of the deflection circuit 8 can be performed easily by inexpensive means.

The composite color video signal from the video encoder 4 is supplied to a video signal processor 6. Since the video signal differs only in the synchronization system, not only the luminance signal, but also the chroma signal can be processed by the NTSC system signal processor.

Thus, a picture can be displayed on the screen of a cathoderay tube (CRT) 7 in response to the video signal which is different from a normal reception video signal only with respect to the synchronization system.

Figure 7:
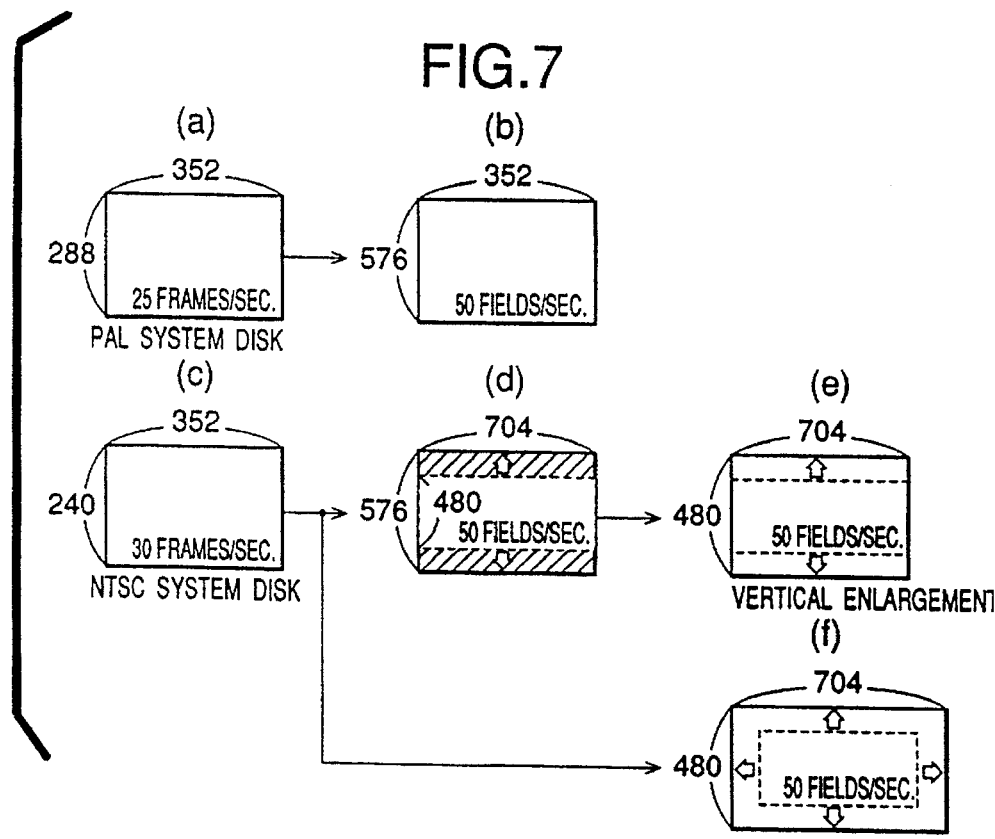
FIG. 7 is an illustration showing display pictures reproduced from video CD picture information when NTSC system is adopted for the television section in FIG. 6.

Assume that the television section adopts the NTSC system and that the synchronizing circuit 5 is set to a field frequency of 50 Hz. If the video CD 1 to be played back is a PAL system video CD containing picture information shown in FIG. 7 (a), the video encoder 4 provides an NTSC system composite color video signal having the number of frames per second 50 and the number of lines per frame 576 compliant with the PAL system, which will be hereinafter referred to as an NTSC 50 signal, and a picture corresponding to the signal is displayed on the screen of the CRT 7. Since the screen is set to 576 lines per frame by the deflection circuit 8, the entire picture provided by picture information recorded on the PAL system video CD is displayed on the screen as shown in FIG. 7 (b). In the first embodiment shown in FIG. 1, the top and bottom of the picture provided by picture information recorded on the PAL system video CD is lost as shown in FIG. 3 (i), but not in the second embodiment.

On the other hand, if the video CD 1 to be played back is an NTSC system video CD containing picture information shown in FIG. 7 (c), the video encoder 4 also provides an NTSC system composite color video signal having the number of frames per second 50 and the number of lines per frame 576, namely, an NTSC 50 signal, and a picture corresponding to the signal is displayed on the screen of the CRT 7, but the number of effective lines having picture data is 480. Therefore, a picture compressed by a factor of 480/576 in the vertical direction is displayed on the screen as shown in FIG. 7 (d), and black portions occur on the top and bottom of the screen. Then, the deflection circuit 8 enlarges the displayed picture up and down in response to the determination result of the disk determination circuit 9, as in the first embodiment shown in FIG. 1, whereby the picture with no aspect distortion is displayed on the entire screen as shown in FIG. 7 (e). To display the picture on the screen having a 16:9 aspect ratio, the picture may be enlarged in the horizontal and vertical directions as shown in FIG. 7 (f), as in the first embodiment shown in FIG. 1.

Therefore, also in this case, the entire picture provided by picture information recorded on the NTSC system video CD is displayed on the screen.

Since the field frequency is 50 Hz, screen flicker occurs, but can also be aggressively used for the viewer so that they can enjoy the atmosphere as if watching a movie in a movie theater, even on an NTSC system television set by darkening its surroundings.

Figure 8:
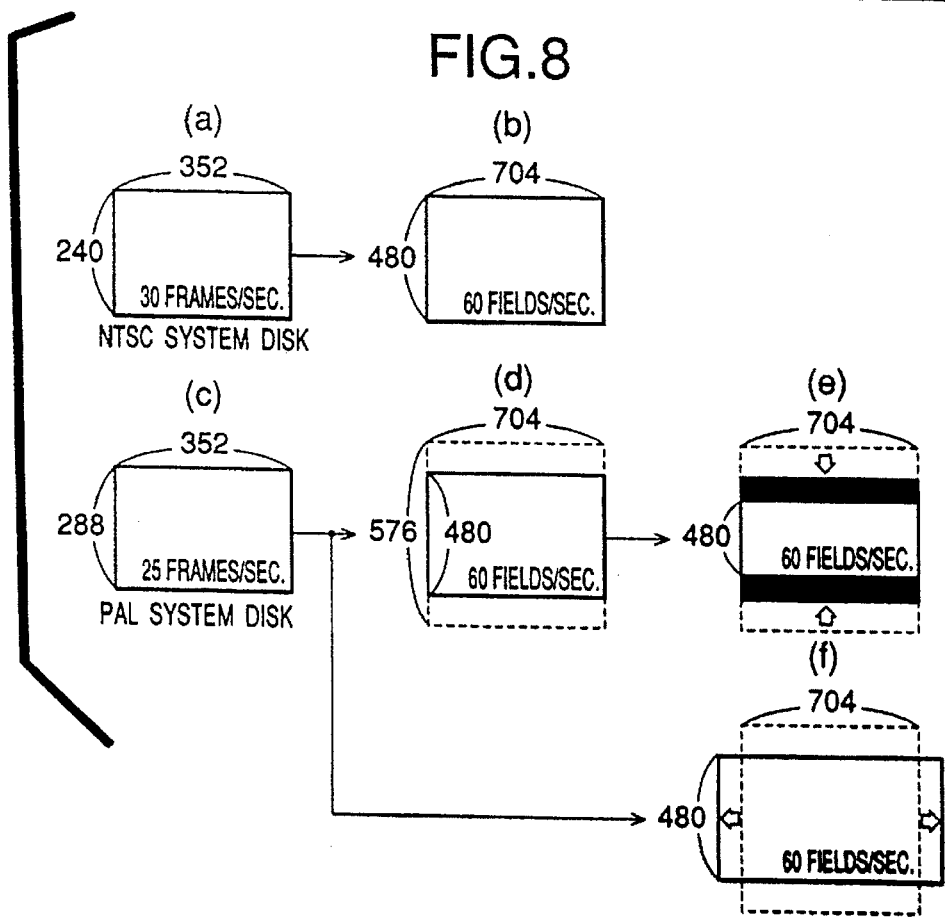
FIG. 8 is an illustration showing display pictures reproduced from video CD picture information when PAL system is adopted for the television section in FIG. 6.

Assume that the television section adopts the PAL system and that the synchronizing circuit 5 is set to field frequency 60 Hz. If the video CD 1 to be played back is an NTSC system video CD containing picture information shown in FIG. 8 (a), the video encoder 4 provides a PAL system composite color video signal having the number of frames per second 60 and the number of lines per frame 480 compliant with the NTSC system, which will be hereinafter referred to as a PAL 60 signal, and a picture corresponding to the signal is displayed on the screen of the CRT 7. Since the screen is set to 480 lines per frame by the deflection circuit 8, the entire picture provided by picture information recorded on the NTSC system video CD is displayed on the screen as shown in FIG. 8 (b). Since the field frequency is 60 Hz, screen flicker does not occur although the picture is displayed on the PAL system television set.

On the other hand, if the video CD 1 to be played back is a PAL system video CD containing picture information shown in FIG. 8 (c), the video encoder 4 also provides a PAL system composite color video signal having the number of frames per second 60 and the number of lines per frame 480, namely, a PAL 60 signal, and a picture corresponding to the signal is displayed on the screen of the CRT 7, but the number of effective lines having picture data is 480. Therefore, the 480-line picture is extended by a factor of 576/480 in the vertical direction for display on the screen as shown in FIG. 8 (d). Then, the deflection circuit 8 compresses the displayed picture up and down in response to the determination result of the disk determination circuit 9, as in the first embodiment shown in FIG. 1, whereby black portions occur on the top and bottom of the screen and a part of the picture provided by picture information is lost, as shown in FIG. 8 (e), but the picture with no aspect distortion and no screen flicker is displayed. To display the picture on the screen having a 16:9 aspect ratio, the picture may be enlarged in the horizontal direction as shown in FIG. 8 (f), as in the first embodiment shown in FIG. 1.

In the second embodiment, the field frequency and the number of lines are made different from the television section system and other specifications are made the same as the television section system, whereby a picture can be displayed without losing video CD picture information and a display picture with no screen flicker can be provided by simple and inexpensive means.

Although the embodiment assumes that the field frequency and the number of lines of the synchronizing circuit 5 are set as described above according to user specification, when the disk determination circuit 9 determines the video CD 1 to be played back, the synchronizing circuit 5 may be automatically controlled as described above based on the determination result. However, since the NTSC 50 and PAL 60 signals differ from the standard video signals in terms of the relationship between horizontal and vertical synchronizing signal frequencies and color subcarrier frequencies, accurate Y/C separation is difficult to execute. Preferably, the signals are supplied to the signal processor in the television section with Y/C separation signal (S signal).

Figure 9:
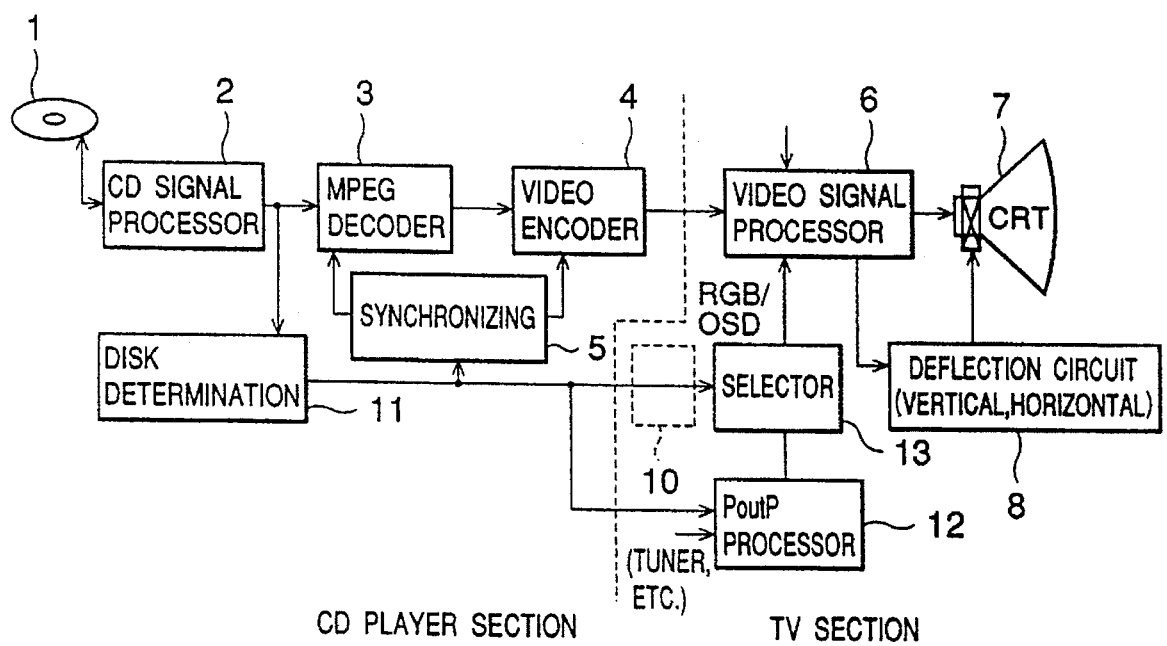
FIG. 9 is a block diagram showing a third embodiment of a television system containing a video CD reproducer according to the invention.

Next, a third embodiment of the invention will be discussed. FIG. 9 is a block diagram showing the third embodiment of a television system containing a video CD reproducer according to the invention, wherein numeral 11 is a disk information extraction and display circuit, numeral 12 is a PoutP processor, and numeral 13 is a selector. Components identical with or similar to those previously described with reference to FIG. 1 are denoted by the same reference numerals in FIG. 9 and will not be discussed again.

In FIG. 9, a signal reproduced from a video CD 1, an NTSC or PAL system video CD is processed by a CD signal processor 2, then moving picture information is supplied to an MPEG decoder 3. The output signal of the CD signal processor 2 is also supplied to the disk information extraction and display circuit 11, which then determines that the video CD 1 is played back from the display rate index, etc., and also extracts additional information such as information concerning the moving picture such as the title, the creator name, and the preceding and following chapters of the moving picture and time-of-day information. The disk information extraction and display circuit 11 controls a synchronizing circuit 5 by determining that the video CD 1 is played back, whereby the synchronizing circuit 5 sets the field frequency and the number of lines to those compliant with the television section system and generates a dot clock having a frequency 4/3 times the frequency of a dot clock required for providing a picture having a 4:3 aspect ratio for the MPEG decoder 3. However, the frequency of color subcarrier supplied to a video encoder 4 is the same as the conventional system.

The MPEG decoder 3 performs processing such as time axis extension for the supplied picture information of the moving picture for converting into a digital video signal. When reading from a memory used in the processing, the MPEG decoder 3 performs time compression of the picture part to 3/4 times that when a picture having a 4:3 aspect ratio is provided for each line with the dot clock as a read clock. The resultant digital video signal has the field frequency and the number of lines compliant with the NTSC or PAL system, but has the picture part for each line subjected to time axis compression so that the picture only exists on a part of the line.

The video signal is supplied to the video encoder 4 and converted into an analog signal, then a carrier color signal is formed with a color subcarrier from the synchronizing circuit 5, and a synchronizing signal is added for forming a composite color video signal. In this case, of course, luminance and color signals have time axes compressed on each line and exist in only a part of the line. The composite color video signal output from the video encoder 4 is supplied to the television section and is processed by a video signal processor 6, then supplied to a cathode-ray tube (CRT) 7.

The CRT 7 has a wide screen having a 16:9 aspect ratio and the entire screen is deflected by a deflection circuit 8. When the composite color video signal is processed by the video signal processor 6 and supplied to the CRT 7, a frame of the moving picture is displayed in a part of the display screen. This will be discussed with reference to FIG. 10 by taking the NTSC system as an example.

Considering an NTSC system CD shown in FIG. 10 (a), the time axis of the picture part is compressed to 3/4 times for each line by the above-mentioned processing of the MPEG decoder 3 in FIG. 9. Since the number of dots per line in the NTSC system is 704, the video signal provides a 704-dot picture part in 704×4/3=938 dots on each line, for example, as shown in FIG. 10 (d). If this is displayed on a screen having a 4:3 aspect ratio, the moving picture compressed in the horizontal direction is displayed to the left of the screen and a blank area occurs on the right of the screen, as shown in FIG. 10 (d). Such an area will be hereinafter referred to as a blank display area 14.

In contrast, if it is displayed on the wide screen of the CRT 7 having a 16:9 aspect ratio shown in FIG. 9, the picture shown in FIG. 10 (d) is extended by a factor of 4/3 in the horizontal direction for display because the entire screen of the CRT 7 is deflected. The moving picture is displayed with no aspect distortion at a 4:3 aspect ratio to the left of the wide screen and a blank display area 14 occurs on the right of the screen, as shown in FIG. 10 (e).

To form an NTSC system video signal having a 4:3 aspect ratio by the MPEG decoder 3 and the video encoder 4 (FIG. 10 (b)) and display it on the wide screen having a 16:9 aspect ratio, the deflection circuit 8 may be controlled for compressing the picture in the horizontal direction in order not to cause aspect distortion, as described with reference to FIG. 3 (b) and (c) in the first embodiment shown in FIG. 1. In this case, blank display areas 14' also occur on the left and right of the wide screen, as shown in FIG. 10 (c).

However, the blank display area 14 shown in FIG. 10 (e) differs from the blank display area 14' in that deflection is executed in the former area 14, whereas deflection is not executed in the latter area 14'. Thus, an image cannot be displayed in the latter blank display area 14', but can be displayed in the former blank display area 14.

Then, in the third embodiment, in FIG. 9 the disk information extraction and display circuit 11 extracts additional information from an output signal of the CD signal processor 2 and embeds it in the blank display area 14 in FIG. 10 (e) for display using the PoutP processor 12 and the selector 13.

That is, when an image signal of character information such as a title or time information is output from the disk information extraction and display circuit 11, the selector 13 selects it and sends to the video signal processor 6, which then inserts the image information in a period corresponding to the blank display area 14 on a predetermined line of a video signal of the moving picture. When image information such as the preceding and following chapters is output from the disk information extraction and display circuit 11, image size compression is executed for the image information by the PoutP processor 12 and the compressed image information is selected by the selector 13 for supply to the video signal processor 6, which then inserts the image signal in the video signal of the moving picture like the image signal of the character information.

Thus, the moving picture with no aspect distortion is displayed at a 4:3 aspect ratio in the larger portion to the left of the wide screen of the CRT 7 and additional information such as the title, the time, and the preceding and following chapters is displayed as PoutP on the right margin of the screen, as shown in FIG. 10 (j). In this case, the PoutP display does not impair the moving picture.

If a video signal received by a tuner (not shown) in the television section is supplied to the PoutP processor 12, the picture of the video signal can be displayed as PoutP in a similar manner.

In the embodiment, the moving picture is moved to the left and the blank display area 14 occurs on the right margin of the wide screen as shown in FIG. 10 (e), because the read start time of the picture part on each line from the memory is set fully to the horizontal synchronizing signal side by the MPEG decoder 3 in FIG. 9. If the read start time of the picture part on each line is set appropriately with respect to the horizontal synchronizing signal, the picture part with the time axis compressed on each line can be set in the center or to the right of the line, for example, as shown in FIG. 10 (f) or (h). Therefore, the blank display area 14 can also be generated on the left and right or in only the left margin of the wide screen, as shown in FIG. 10 (g) or (i).

Thus, according to the embodiment, the synchronizing circuit 5 supplies a dot clock having a frequency higher than that required for providing a picture having a 4:3 aspect ratio to the MPEG decoder 3, which then executes time axis compression of picture information reproduced from a video CD 1 for each line and generates a video signal containing a blank information part on each line. If the video signal containing the blank information part is deflected throughout the display screen of the CRT 7, the blank information part forms a display area (blank display area) separate from an area in which a picture is displayed according to the picture information recorded on the video CD 1 on the display screen. An image can be displayed in the blank display area because deflection is executed. If additional information extracted by the disk information extraction and display circuit 11 is displayed in the blank display area, the picture provided by the picture information does not overlap the image provided by the additional information. Therefore, the embodiment enables the user to obtain additional information as well as the picture provided by the picture information without losing the picture from the picture information. Moreover, the moving picture can be displayed without aspect distortion.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within the scope of the claims, or equivalence of such scope are therefore intended to be covered by the claims.

What is claimed is:

1. A television system comprising a television section for processing a video signal for displaying a picture on a display screen of a cathode-ray tube (CRT), a video CD reproducer for reproducing picture information recorded on a video CD and converting the reproduced picture information into a video signal, and means for providing a deflection to said video signal throughout the display screen of said CRT, wherein the deflected video signal is supplied thereto for displaying a picture, said television system further comprises:

(a) compression means for executing time axis compression of the picture information reproduced from the video CD for each line and generating a video signal having a blank information part on each line; and (b) extraction means for extracting additional information other than the picture information, recorded on the video CD, wherein when the video signal having a blank information part generated by said compression means is deflected and supplied to the display screen of said CRT for displaying the picture, the additional information extracted by said extraction means is displayed in a blank display area on the display screen formed by the blank information part.

2. The television system as claimed in claim 1 wherein said CRT has a 16:9 aspect ratio.

3. The television system as claimed in claim 1 wherein said compression means includes means for making a frequency of a dot clock supplied to a means for converting the picture information recorded on the video CD into a video signal larger than a frequency required for providing a picture having a 4:3 aspect ratio.

4. A television system comprising:

a video CD player including a CD signal processor for reading out picture information from a video CD, the picture information compressed to comply with the MPEG standard, a synchronizing means for generating a synchronizing signal, a frequency of the synchronizing means being changed in accordance with the synchronizing signal, a MPEG decoder for performing a decoding process in which the picture information read out by said CD signal processor is extended to comply with the MPEG standard to video data based on said synchronizing signal, and a video encoder for converting the video data to a composite color video signal, for reproducing TV signals from different TV systems on said video CD player, and a television section including a cathode-ray tube (CRT), a video signal processor for processing the composite color video signal and generating a video signal representing a motion picture, and deflection means for providing a deflection to said video signal based on said synchronizing signal, wherein the deflected video signal is supplied to the display screen of said CRT for displaying a picture, said television system further comprising:
  (a) determination means for extracting rate index information from the picture information read out from the video CD by said signal processor, and determining a standard system of the picture information recorded on the video CD in accordance with said rate index information, said rate index indicating a frequency of fields or frames of the motion picture represented by the picture information; and
  (b) deflection control means for controlling said deflection to be provided by said deflection means in accordance with the standard system determined by said determination means.

5. A television system comprising, a video CD player including a CD signal processor for reading out picture information from a video CD, the picture information compressed to comply with the MPEG standard, a synchronizing means for generating a synchronizing signal, a frequency of the synchronizing means being changed in accordance with the synchronizing signal, a MPEG decoder for performing a decoding process in which the picture information read out by said CD signal processor is extended to comply with the MPEG standard to video data based on said synchronizing signal, and a video encoder for converting the video data to a composite color video signal, for reproducing TV signals from different TV systems on said video CD player, and a television section including a cathode-ray tube (CRT), a video signal processor for processing the composite color video signal and generating a video signal representing a motion picture, and deflection means for providing a deflection to said video signal based on said synchronizing signal and a deflection current supplied thereto, wherein the deflected video signal is supplied to the display screen of said CRT for displaying a picture, said television system further comprising:
  (a) determination means for extracting rate index information from the picture information read out from the video CD by said signal processor, and outputting a control signal in accordance with said rate index information, said rate index information indicating a frequency of fields or frames of the motion picture represented by the picture information; and
  (b) deflection control means for controlling said deflection of the video signal based on the control signal output from said determination means, said deflection control means having means for controlling the deflection current supplied to the deflection means in accordance with the control signal.

6. A television system comprising, a video CD player including a CD signal processor for reading out picture information from a video CD, the picture information compressed to comply with the MPEG standard, a synchronizing means for generating a synchronizing signal, a frequency of the synchronizing means being changed in accordance with the synchronizing signal, a MPEG decoder for performing a decoding process in which the picture information read out by said CD signal processor is extended to comply with the MPEG standard to video data based on said synchronizing signal, and a video encoder for converting the video data to a composite color video signal, for reproducing TV signals from different TV systems on said video CD player, and a television section which includes a cathode-ray tube (CRT), a video signal processor for processing the composite color video signal and generating a video signal representing a motion picture, and deflection means for providing a deflection to said video signal based on said synchronizing signal and deflection current supplied thereto, wherein the deflected video signal is supplied to the display screen of said CRT for displaying a picture, said television system further comprising:
  (a) determination means for extracting rate index information from the picture information read out from the video CD by said signal processor, determining a standard system of the picture information recorded on the video CD in accordance with said rate index information, and outputting a control signal in accordance with the determined standard system, said rate index information indicating a frequency of fields or frames of the motion picture represented by the picture information; and
  (b) deflection control means for controlling said deflection of the video signal based on the control signal output from said determination means, said deflection control means having means for controlling the deflection current supplied to the deflection means in accordance with the control signal.

7. The television system as claimed in claim 4 wherein said synchronizing means comprises means for controlling a frequency of said synchronizing signal based on an instruction supplied thereto.

8. The television system as claimed in claim 4 wherein said synchronizing means comprises means for controlling a frequency of said synchronizing signal based on the standard system of the picture information determined by said determination means.

9. The television system as claimed in claim 4 wherein when the television section standard is an NTSC system and said determination means determines that the standard of the picture information recorded on the video CD is PAL, said deflection control means controls deflection of the video signal so as to reduce the picture on the display screen of said CRT in a vertical direction or enlarge it in a horizontal direction.

10. The television system as claimed in claim 4 wherein when the television section standard is an NTSC system and an aspect ratio is 16:9 and said determination means determines that the standard of the picture information recorded on the video CD is PAL, said deflection control means controls deflection of the video signal so as to enlarge the picture on the display screen of said CRT in a horizontal or vertical direction.

11. The television system as claimed in claim 4 wherein when the television section standard is a PAL system and said determination means determines that the standard of the picture information recorded on the video CD is NTSC, said deflection control means controls deflection of the video signal so as to enlarge the picture on the display screen of said CRT in a vertical direction.

12. The television system as claimed in claim 4 wherein when the television section standard is a PAL system and an aspect ratio is 16:9 and said determination means determines that the standard of the picture information recorded on the video CD is NTSC, said deflection control means controls deflection of the video signal so as to enlarge the picture on the display screen of said CRT in horizontal and vertical directions.

* * * * *